United States Patent
Clarke et al.

(10) Patent No.: US 9,626,410 B2
(45) Date of Patent: Apr. 18, 2017

(54) VERTICALLY PARTITIONED DATABASES

(71) Applicant: International Business Machines Corporation, Armonk, NY (US)

(72) Inventors: Michael P. Clarke, Ellenbrook (AU); John A. W. Kaputin, Perth (AU); King-Yan Kwan, Perth (AU); Andrew Wright, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 14/674,640

(22) Filed: Mar. 31, 2015

(65) Prior Publication Data

US 2016/0292221 A1 Oct. 6, 2016

(51) Int. Cl.
*G06F 21/00* (2013.01)
*G06F 17/30* (2006.01)
*G06F 21/60* (2013.01)

(52) U.S. Cl.
CPC .. *G06F 17/30454* (2013.01); *G06F 17/30315* (2013.01); *G06F 17/30339* (2013.01); *G06F 21/602* (2013.01)

(58) Field of Classification Search
CPC combination set(s) only.
See application file for complete search history.

(56) References Cited

U.S. PATENT DOCUMENTS

| | | | |
|---|---|---|---|
| 7,797,342 B2 | 9/2010 | Banks et al. | |
| 7,890,774 B2 | 2/2011 | Agrawal et al. | |
| 8,620,888 B2 * | 12/2013 | Basu | G06F 17/30595 707/705 |
| 8,639,947 B2 | 1/2014 | Elovici et al. | |
| 8,812,877 B2 * | 8/2014 | Mori | G06F 17/30289 713/189 |
| 2014/0365424 A1 * | 12/2014 | Herbst | G06F 17/30501 707/607 |

OTHER PUBLICATIONS

"Securing Stored Data Using Transparent Data Encryption"; Oracle Database Advanced Security Administrator's Guide; Printed Jan. 23, 2015; Copyright 1996, 2009, Oracle and/or it affiliates; <https://docs.oracle.com/cd/E15586_01/network.1111/e10746/asotrans.htm>.

* cited by examiner

*Primary Examiner* — Ghazal Shehni
(74) *Attorney, Agent, or Firm* — William H. Hartwell

(57) ABSTRACT

A method for a distributed computing system managing vertically partitioned data includes receiving a query for a first row of data, where a first column of the first row of data is stored in a first data server and a second column of the first row of data is stored a second data server. The method translates the query for the first row of data into two queries, wherein a first translated query is for the first column of the first row of data and a second translated query is for the second column of the first row of data. The method sends the first translated query to the first data server and the second translated query to the second data server. Responsive to receiving the first column and the second column of the first row of data, the method sends the first column and the second column of the first row of data.

20 Claims, 5 Drawing Sheets

```
SELECT
CUSTOMER.NAME. CUSTOMER.ADDRESS. CUSTOMER.CREDITCARD     ~302
WHERE CUSTOMER.USERID = 'FRED'
```

```
QUERY corr
GETKEY guid CUSTOMER.USERID DATA 'FRED'
FOREACH guid {
        GET CUSTOMER.NAME.FIRST KEY guid
        GET CUSTOMER.NAME.LAST KEY guid
        GET CUSTOMER.ADDRESS.STREET KEY guid
        GET CUSTOMER.ADDRESS.STATE KEY guid
        GET CUSTOMER.ADDRESS.POSTCODE KEY guid
        GET CUSTOMER.ADDRESS.NUMBER KEY guid
        GET CUSTOMER.CREDITCARD.NO KEY guid
        GET CUSTOMER.CREDITCARD.EXP KEY guid
        GET CUSTOMER.CREDITCARD.CCY KEY guid
        RETURN CUSTOMER.NAME CUSTOMER.ADDRESS CUSTOMER.CREDITCARD
        }
```
304

```
GETKEY rcorr DATA 'FRED'
GET rcorr KEY eguid            ~306
```

```
nn||first||last
n||street||state||postcode||number    ~308
```

```
UPDATE corr
GETKEY guid CUSTOMER.USERID DATA 'FRED'
SET CUSTOMER.ADDRESS.STATE KEY guid DATA 'NY'
SET CUSTOMER.ADDRESS.STREET KEY guid DATA 'LONG AVE'    ~310
SET CUSTOMER.ADDRESS.NUMBER guid DATA '1234'
SET CUSTOMER.ADDRESS. POSTCODE KEY guid DATA 'ABC123'
```

FIG. 3

```
GUIDGEN corr number_of_rows
RESP corr GUID guid
INSERT CUSTOMER.ADDRESS.STATE GUID guid[ 1 ] DATA 'NY'
```
~ 402

```
INSERT corr
GUIDGEN guid 2
INSERT CUSTOMER.NAME.FIRST KEY guid[0] DATA 'TOM'
INSERT CUSTOMER.NAME.LAST KEY guid[0]
INSERT CUSTOMER.ADDRESS.STREET KEY guid[0]
INSERT CUSTOMER.ADDRESS.STATE KEY guid[0]
INSERT CUSTOMER.ADDRESS.POSTCODE KEY guid[0]
INSERT CUSTOMER.ADDRESS.NUMBER KEY guid[0]
INSERT CUSTOMER.CREDITCARD.NO KEY guid[0]
INSERT CUSTOMER.CREDITCARD.EXP KEY guid[O]
INSERT CUSTOMER.CREDITCARD.CCV KEY guid[0]
INSERT CUSTOMER.USERID KEY guid[0] DATA 'TOM'
INSERT CUSTOMER.NAME.FIRST KEY guid[1] DATA 'HARRY'
INSERT CUSTOMER.NAME.LAST KEY guid[1]
INSERT CUSTOMER.ADDRESS.STREET KEY guid[1]
INSERT CUSTOMER.ADDRESS.STATE KEY guid[1]
INSERT CUSTOMER.ADDRESS.POSTCODE KEY guid[1]
INSERT CUSTOMER.ADDRESS.NUMBER KEY guid[1]
INSERT CUSTOMER.CREDITCARD.NO KEY guid[1]
INSERT CUSTOMER.CREDITCARD.EXP KEY guid[1]
INSERT CUSTOMER.CREDITCARD.CCV KEY guid[1]
INSERT CUSTOMER.USERID KEY guid[1] DATA 'HARRY'
```
~ 404

```
GETKEY guid DATA 'FRED'
FOREACH guid {
        DEKETE ALL KEY guid
}
```
~ 406

FIG. 4 ated for performance rather than security, due to the volume of information being stored in each database. Being able to maximize storage without sacrificing performance has typically taken priority over security of the content being stored. In an example distributed computing environment, a hundred million records can be stored across twenty databases, where five million records are stored in each of the twenty databases. The records are partitioned horizontally, such that all the information of a single record is stored in one database. The partitioning of the records according to the twenty databases may include additional considerations, such as geographical locations, where a single database services a single geographic location. Though such a horizontal partitioning of records reduces exposure to all of the records, five million records are at risk if at least one database becomes compromised by someone accessing the database without authorization. The administrator has to focus on maintaining security across all twenty databases rather than one database and the ramifications of losing five million records are substantially the same as losing a hundred million records.

VERTICALLY PARTITIONED DATABASES

BACKGROUND

The present invention relates generally to databases and more particularly to storing portions of a file across multiple servers.

Currently, databases in a distributed computing environment are typically partitioned for performance rather than security, due to the volume of information being stored in each database. Being able to maximize storage without sacrificing performance has typically taken priority over security of the content being stored. In an example distributed computing environment, a hundred million records can be stored across twenty databases, where five million records are stored in each of the twenty databases. The records are partitioned horizontally, such that all the information of a single record is stored in one database. The partitioning of the records according to the twenty databases may include additional considerations, such as geographical locations, where a single database services a single geographic location. Though such a horizontal partitioning of records reduces exposure to all of the records, five million records are at risk if at least one database becomes compromised by someone accessing the database without authorization. The administrator has to focus on maintaining security across all twenty databases rather than one database and the ramifications of losing five million records are substantially the same as losing a hundred million records.

SUMMARY

Embodiments of the present invention includes a method, computer program product and computer system for a distributed computing system managing vertically partitioned data. A computer-implemented method includes receiving a query for a first row of data, wherein a first column of the first row of data is stored in a first data server and a second column of the first row of data is stored a second data server. The method translates the query for the first row of data into two queries, wherein a first translated query is for the first column of the first row of data and a second translated query is for the second column of the first row of data. The method sends the first translated query to the first data server and the second translated query to the second data server. Responsive to receiving the first column and the second column of the first row of data, the method sends the first column and the second column of the first row of data to an electronic device associated with the received query.

BRIEF DESCRIPTION OF THE DRAWINGS

FIG. 3 illustrates an example query for data stored in multiple data servers, a translated query for the data stored in multiple data servers, and an example for updating data stored in multiple data servers, in accordance with the present invention.

FIG. 4 illustrates an example insertion of multiple rows of data and GUID key deletion, in accordance with the present invention.

DETAILED DESCRIPTION

Embodiments in accordance with the present invention allow for vertical splicing of data across multiple databases. In an example, a hundred million records with twenty columns of data for each of the hundred million records are stored across twenty databases. Embodiments in accordance with the present invention store each column of data in a single database, alternative to storing five million records with twenty columns of data for each record in a single database. As a result, if a single database is compromised, then the compromised data only includes a single column of data rather than five million records with twenty columns of complete data for each of the five million records.

Furthermore, additional splicing of data can include partitioning high risk data, such as credit card numbers or social security numbers into two or more columns, where each column is stored on a separate data server. An administrative user can deploy additional security measures for the databases containing the high risk data compared to low risk data, such as a column of first names. Additional splicing of high risk data ensures that if a single database is compromised, a column of four or five digits for a hundred million records is compromised rather than a hundred million complete credit card or social security numbers. In order to obtain the complete set of credit card numbers, an unauthorized user would have to identify another database in the distributed computing environment that includes the remaining digits and determine how to align each of the vertically partitioned columns of data.

Embodiments in accordance with the present invention allow for an addition of a 'knowledge wall' for security. The server that receives the query (i.e., query server) does not store any information pertaining to the data servers that store the vertically partitioned data. The query server stores information pertaining to one or more router servers to which internal requests for data are sent. The router servers are capable of further decomposing the query, identifying which data servers to pass the queries onto, encryption keys, and the mechanics of reassembling the each row of data from the fragments received from the data servers. As a result, if a query server becomes compromised, there is no access to the data through the external network outside the query server.

Figure 1:
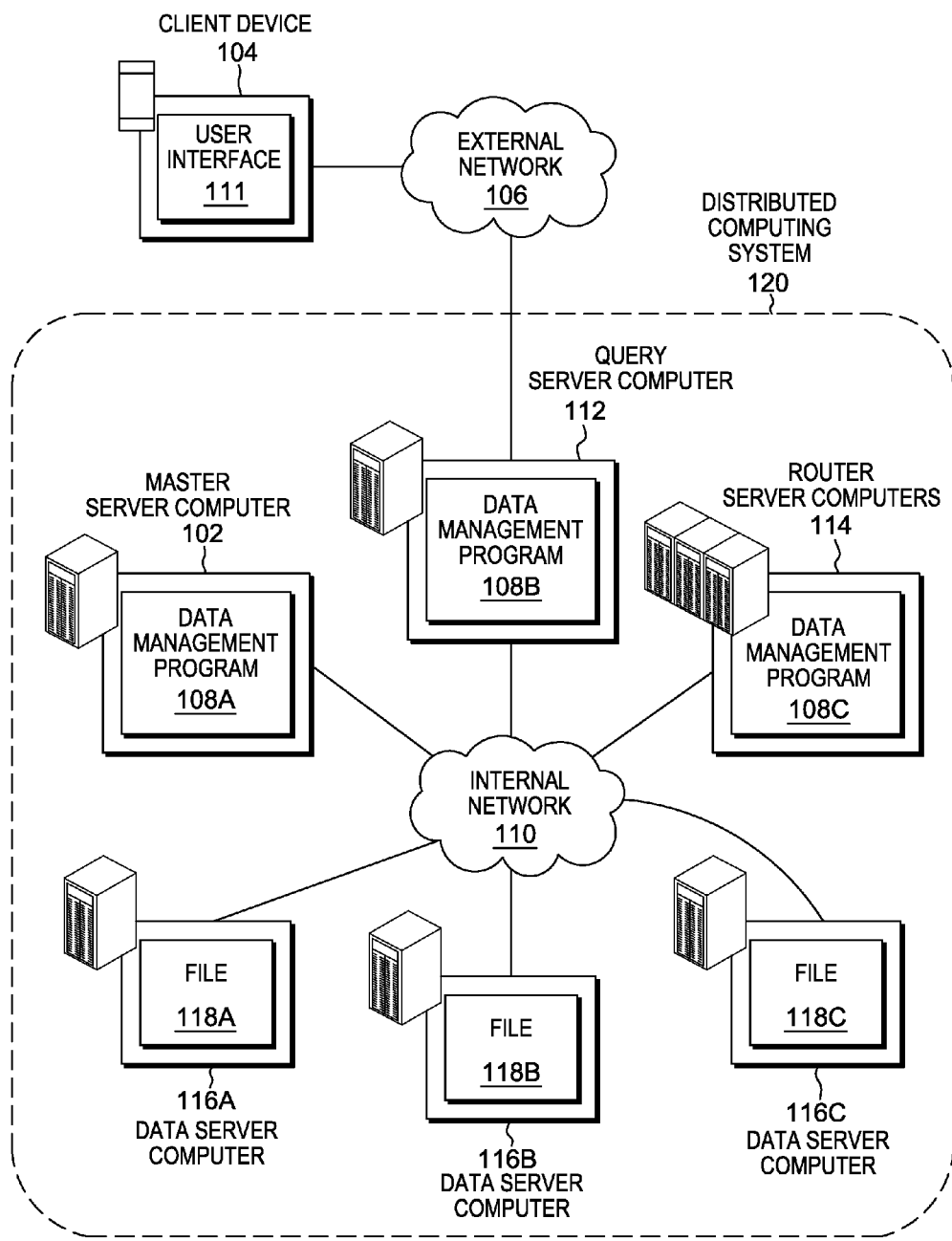
FIG. 1 is a functional block diagram illustrating one embodiment of a distributed data processing environment, in accordance with the present invention.

Example embodiments in accordance with the present invention will now be described in detail with reference to the drawing figures. FIG. 1 is a functional block diagram illustrating a distributed data processing environment. The distributed data processing environment includes master server computer 102 and client device 104. The distributed data processing environment also includes a distributed computing system 120 with master server computer 102, query sever computer 112, router server computers 114, and data server computers 116A, 116B, and 116C, which communicate over internal network 110. In this embodiment, only query server computer 112 communicates with external network 106, while only master server computer 102 and router server computers 114 communicate with data server computers 116A, 116B, and 116C. Additionally, a virtual private network (VPN) not illustrated in FIG. 1 can exist between query server computer 112 and router server computers 114.

Master server computer 102 may be a desktop computer, a laptop computer, a tablet computer, a specialized computer server, a smartphone, or any other computer system known in the art. In certain embodiments, master server computer 102 represents a computer system utilizing clustered computers and components that act as a single pool of seamless resources when accessed through either external network 106 or internal network 110, as is common in data centers and with cloud computing applications. In general, master server computer 102 is representative of any programmable electronic device or combination of programmable electronic devices capable of executing machine readable program instructions and communicating with other computer devices via a network.

In this embodiment, master server computer 102 receives administrative credentials from client device 104 but is not directly accessible by a user of client device 104. Master server computer 102 may include a management console, not illustrated in FIG. 1, through which settings and contents of master server computer 102 may be accessed. Master server computer 102 manages query server computer 112, router server computers 114, and data server computers 116A, 116B, and 116C. Master server computer 102 establishes storage layouts, router tables, and stores master copies of the storage layouts and router tables along with master encryption keys for each of the data server computers 116A, 116B, and 116C. Additionally, master server computer 102 can store the master encryption keys, storage layouts, and router tables in an encrypted file.

Query server computer 112 may be a desktop computer, a laptop computer, a tablet computer, a specialized computer server, a smartphone, or any other computer system known in the art. In certain embodiments, query server computer 112 represents a computer system utilizing clustered computers and components that act as a single pool of seamless resources when accessed through internal network 110, as is common in data centers and with cloud computing applications. In general, query server computer 112 is representative of any programmable electronic device or combination of programmable electronic devices capable of executing machine readable program instructions and communicating with other computer devices via a network.

In this embodiment, query server computer 112 processes inbound structured query language (SQL) queries. Query server computer 112 facilitates the routing of SQL queries through router server computers 114 to data server computers 116A, 116B, and 116C and the reconstruction of stored records (e.g., file 118A, 118B, and 118C). Query server computer 112 is supported by routing server computers 114, where router server computers 114 hold a key for where the portions of file 118 are stored. The storage layout that master server computer 102 provides to query server computer 112 includes a list of tables and column names, but does not include the actual data that fills the tables and column. Query server computer 112 utilizes the storage layout to decompose the SQL queries by column names and sends the information to routing servers 114 for processing. Query server computer 112 receives the content being requested through the SQL query from router server computers 114 but any metadata that may identify which column of data came from which data sever computer is not present.

Data management program 108A, 108B, and 108C represent different portions of a program operating in distributed computing system 120, managing file 118A, 118B, and 118C stored on data server 116A, 116B, and 116C, respectively. File 118A, 118B, and 118C each represent a portion of vertically partitioned data. Data management program 108A on master server computer 102 receives queries from client device 104 and manages query server computer 112 and router server computers 114. Data management program 108B on query server computer 112 processes the received queries from client device 104 and sends the query to the appropriate router server computers 114. Data management program 108C on router server computers 114 receives the query from query server computer 112 and processes the query according to data server computers 116A, 116B, and 116C.

In another embodiment, data management program 108 operates in a non-distributed computing system, where there are files for each data column rather than separate distributed servers storing the data columns. In yet another embodiment, data management program 108 operates in a hybrid combination environment of a non-distributed computing system and distributed computing system 120.

Data server computers 116A, 116B, and 116C may be a desktop computer, a laptop computer, a tablet computer, a specialized computer server, a smartphone, or any other computer system known in the art. In certain embodiments, each data server computers 116A, 116B, and 116C represents a computer system utilizing clustered computers and components that act as a single pool of seamless resources when accessed through internal network 110, as is common in data centers and with cloud computing applications. In general, data server computers 116A, 116B, and 116C are representative of any programmable electronic device or combination of programmable electronic devices capable of executing machine readable program instructions and communicating with other computer devices via a network.

In this embodiment, each data server computer 116A, 116B, and 116C stores a vertically partitioned portion of data represented by file 118A, 118B, and 118C, respectively. File 118A, 118B, and 118C each include two columns of content. The first column of content includes the vertically partitioned portion of data and the second column of content includes an encrypted form of a global unique identifier (GUID) for each row of the vertically partitioned portion of data. The encrypted GUID value identifies the data in each row of the original table. Data management program 108 utilizes a specific encryption key for each data server computer 116A, 116B, and 116C, where master server computer 102 and router server computers 114 store the encryption keys. Data server computers 116A, 116B, and 116C receive and send the encrypted forms of the GUID, rather than the raw data in decrypted form. In this embodiment, data server computers 116A, 116B, and 116C do not perform any encryption operations and do not store the key to the encrypted GUID.

Client device 104 may be a desktop computer, a laptop computer, a tablet computer, a specialized computer server, a smart phone, or any programmable electronic device capable of communicating with master server computer 102 via external network 106. In general, client device 104 represents any programmable electronic device or combination of programmable electronic devices capable of executing machine readable program instructions and communicating with other computing devices via a network, such as external network 106.

User interface 111 provides an interface between a user of client device 104 and data management program 108A. User interface 111 may be a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. User interface 111 may also be mobile application software that provides an interface between a user of client device 104. Mobile application software, or an "app", is a computer program designed to run on smart phones, tablet computers and other mobile devices. User interface 111 allows for a user to query data management program 108A for data stored across data server computer 116A, 116B, and 116C.

In general, external network 106 can be any combination of connections and protocols that will support communications among master server computer 102 and client device 104. External network 106 can include, for example, a local area network (LAN), a wide area network (WAN), such as the internet, a cellular network, or any combination of the preceding, and can further include wired, wireless, and/or fiber optic connections. In one embodiment, data management program 108A can be a web service accessible via external network 106 to a user of client device 104. In another embodiment, data management program 108A may be operated directly by a user of mater server computer 102 via a management console, not illustrated in FIG. 1. Internal network 110 can be any combination of connections and protocols that will support communications among master server computer 102, query server computer 112, router server computers 114, and data server computers 116A, 116B, and 116C. Internal network 110 can include, for example, a local area network (LAN), a wide area network (WAN), such as the internet, a cellular network, or any combination of the preceding, and can further include wired, wireless, and/or fiber optic connections.

Figure 2:
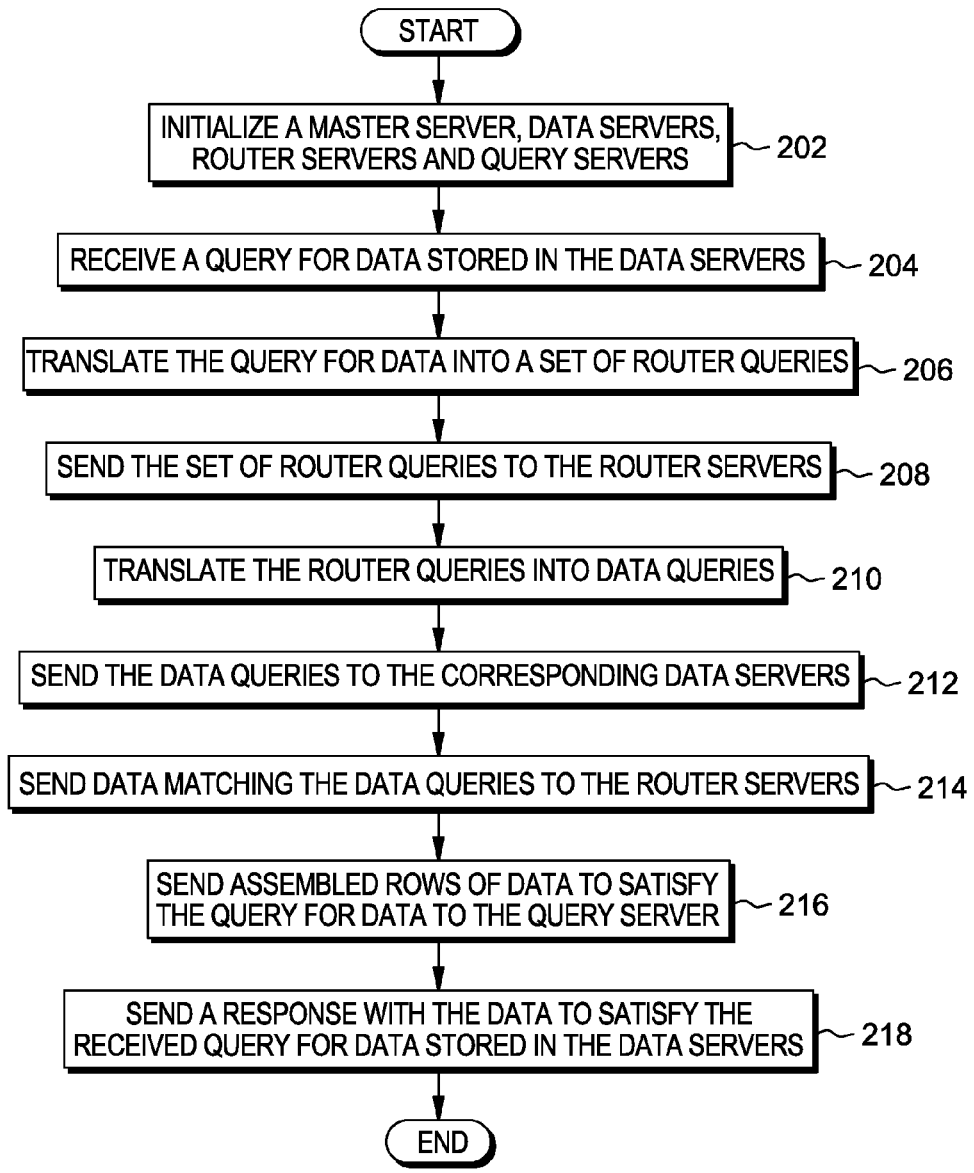
FIG. 2 is a flowchart depicting one embodiment of a distributed computing system managing vertically partitioned data across multiple databases, in accordance with the present invention.

FIG. 2 is a flowchart depicting one embodiment of a data management program for managing vertically partitioned data across multiple databases, in accordance with the present invention. As depicted, a method includes initializing (202) servers in a distributed computing environment, receiving (204) a query for data stored in the data servers, translating (206) the query into a set of router queries, sending (208) the set of router queries, translating (210) the router queries into data queries, sending (212) the data queries to the corresponding data servers, sending (214) data matching the data queries to the router servers, sending (216) assembled rows of data to the query server, and sending (218) a response with the data to satisfy the query for data to the query server. In one embodiment, the method is conducted by data management program 108A, 108B, and 108C in distributed computing system 120.

The method may commence by initializing (202) a master server, data servers, router servers, and query servers. In this embodiment, a distributed computing system initializes the master server and each of the data servers where columns of data are stored. The distributed computing system initializes the router servers by sending a routing table for the data stored in the data servers, to the router servers. The distributed computing system initializes the query servers by sending the data layout table for data stored in the data server to the query servers. The distributed computing system can instruct a master server to perform allocation of GUIDs for each entry into a column of data for the data servers or alternatively, distributed computing system can instruct a separate server in the distributed computing system to handle the GUID allocation. It is to be noted that the master server, data servers, router server, and query server in the distributed computing system may initialize in an order different than the previously described embodiment.

The method may continue by receiving (204) a query for data stored in the data servers. In this embodiment, the distributed computing system receives a query for data stored within the vertically partitioned database. Since each data server includes a portion of data (i.e., column of data), the distributed computing environment receives the different portions of the data from the data servers. The distributed computing system can include a verification of credentials to ensure the user sending the query has access to the data stored in the data servers. In one example, the verification of credentials of a user may be for the data servers in the distributed computing system, where the user can gain access to all the data in the data servers. In another example, the verification of credentials of a user may be for a specific row of data stored across the data servers, where the user can only query the database for data associated with the verification credentials. In yet another example, a user may only be authorized to see data from some columns in the database, which correspond to a portion of the available data servers.

The method may continue by translating (206) the query for data into a set of router queries. A query server translates the query for data into a set of router queries, where each router query requests a particular column of the queried data. The query server includes a storage layout, where the storage layout includes a list of tables and column names. The query server decomposes the received query by matching column names to the data being queried and creating a set of one or more router queries for sets of matching columns.

The method may continue by sending (208) the set of router queries to a router server. The method may continue by translating (210) the router queries into data queries. Each router server processes the router queries against the data servers storing the queried data. The routing servers include routing tables, as provided by the master server, where the tables include identities of the data servers for each data column and a key for each data server used to encrypt the GUIDs of each row of data in the column. The method may continue by sending (212) the data queries to the corresponding data servers.

The method may continue by sending (214) data matching the data queries to the router server. The router sever can decrypt the GUIDs in the matching rows and re-crypt the GUIDs to allow the data servers to send the remaining columns of data being requested matching the response to the first query. The router sever decrypts the GUIDs from the response received from the various data servers and utilizing the decrypted GUIDs to assemble the complete rows of data to satisfy the data queries. The rows of data being assembled to satisfy the data queries do not include any GUID information to ensure data integrity.

The method may continue by sending (216) assembled rows of data to satisfy the query for data to the query sever. The query server can format the assembled rows of data and, if necessary, can combine the data into a response for the received query for data. The method may continue by sending (218) a response with the data to satisfy the received query for data stored in the data servers.

FIG. 3 illustrates an example query for data stored in multiple data servers, a translated query for the data stored in multiple data servers, and an example for updating data stored in multiple data servers, in accordance with the present invention.

Query code 302 illustrates a request for data including a customer's name, the customer's address, and the customer's credit card information for a particular user identification (i.e., Fred). The data can include security risk levels, where the security risk levels dictate across how many data servers the information is stored across. For example, data management program 108 identifies a customer's name as low risk and stores the name on a single data server. In another example, data management program 108 identifies a customer's credit card information as high risk and stores a credit card number on a first data server, a credit card expiration date on a second data server, and a card verification value (CVV) on a third data server in the distributed computing environment. Additionally, data management program 108 can store each credit card number in portions, subsequent to encryption, where each portion of the credit card number is stored on separate data servers.

In this illustrative example, the customer's name includes a first and a last name, where a first name is considered a first column of data stored in a first server and a last name is considered a second column of data stored in a second server, separate from the first sever. The customer's address includes four portions, a street, a state, a postcode, and a house number. In this embodiment, each portion of the address is considered a column of data stored in a separate data server. In another embodiment, the four portions of the address are stored on a single data server. The customer's credit card information includes a credit card number, a credit card expiration date, and a credit card CVV. Data management program 108 stores the credit card number in three portions, where each portion of the encrypted credit card number is stored on three separate data servers. Data management program 108 stores the credit card expiration date and the credit card CVV on two separate data servers.

Translated code 304 illustrates query code 302 translated by data management program 108 in the distributed computing system. The "QUERY" statement specifies a correlator, which allows for a query server to match a query for data with a query response. The "GETKEY" statement obtains the "GUID" associated with the rows matching the specified data value. The "FOREACH" statement indicates a block of actions required for each member of the returned set. The "GET" statement obtains a data value from a data server matching the specified key (e.g., "POSTCODE" or "STATE"). The "RETURN" statement produces a row of output data representative of what is returned to the query server.

Statement 306 shows two alternate forms of the "GET" request used between the router servers and the data servers. The first, "GETKEY", is to search data servers for data matching the value (i.e., 'FRED') and then to return the encrypted GUID associated with it. The second, "GET", is to retrieve the data value associated with a known encrypted GUID value. The "GETKEY" call at the start of query 306 results in a "GETKEY" request being sent to the data server that holds the "CUSTOMER.USERID" data. As a result, a list of one or more encrypted GUID values returns to the router server. In this example, a single encrypted GUID value returns for the single userid, to the router server.

Continuing the processing of this query, each of the data servers holding the other data that has been requested is sent one or more "GET" requests, for example, as shown in statement 306. To construct these statements, the router decrypts the encrypted GUID returned by the "GETKEY" query and re-encrypts the GUID with the corrected master GUID key for the data server that the "GET" request is subsequently sent to. The data servers respond by returning the data values associated with those encrypted GUID values. Multiple "GET" requests for the same data server may be bundled together for transmission and processing.

Continuing the processing of this query, the router server decrypts the encrypted GUIDs in each data response and utilizes the decrypted GUIDs to match the data returned from different servers to reassemble the complete data records. These data records, which do not contain the GUID or any encrypted version of it, are sent back to the query server with the data values ordered as specified in the "RETURN" statement at the end of query 304. The data records may be encoded using a vector format, as shown in statement 308, where the 'nn' value is the number of data values in the vector and the 'll' values are the lengths of each data value.

Data management program 108 can receive requests for updates to data stored in the data servers, where the query servers can receive the updates and translate through the router servers. Update code 310 represents a request to update an address for a particular user identification (i.e., Fred). Since the address is stored across four data servers, four requests are sent to update the address information for the particular user identification. Update code 310 includes an update to a state, a street, a house number, and a post code of an address for the particular user identification.

FIG. 4 illustrates an example insertion of multiple rows of data and GUID key deletion, in accordance with the present invention.

Row insertion process 402 includes a request to a master server for a new GUID for each row of data being inserted across the data servers. Subsequent to receiving a response with the GUID for the new row of data, the router server utilizes the received GUIDs to insert each row of new data to the data servers. Insertion code 404 represents an example of inserting two rows of data into the data servers, subsequent to receiving two GUIDs for the two rows of data. Insertion code 404 includes a customer's name, the customer's address, and the customer's credit card information for two particular user identifications (i.e., "Tom" and "Harry"). Each of the two particular user identifications include a unique GUID for identification when receiving queries for the data.

Deletion request code 406 includes an identified GUID for the row of data to be deleted across the data servers. In this example, deletion request code 406 is a request to delete a row of data for a particular user identification, "Fred". The routing server sends the request to the data servers, instructing the data servers to delete any row of data matching the GUID. Upon completion of deletion of all the rows of data across the data servers, the router server can send the user a completion pass or fail notification for the request.

Addition of columns changes a structure of a database and as a result, a data layout profile is edited and the database is stopped and restarted, to reflect the addition of the new columns. With every addition of a column, a new data server holds the data and can initialize a record for each GUID with null values for the column being stored in the new data server. Removal of columns includes the removal of the column from the data mapping but not the actual data servers in the event the column of data is reinstated. Permanent column removal includes the removal of the column from the data mapping and scrubbing the data server of any data pertaining to the column being permanently deleted.

Figure 5:
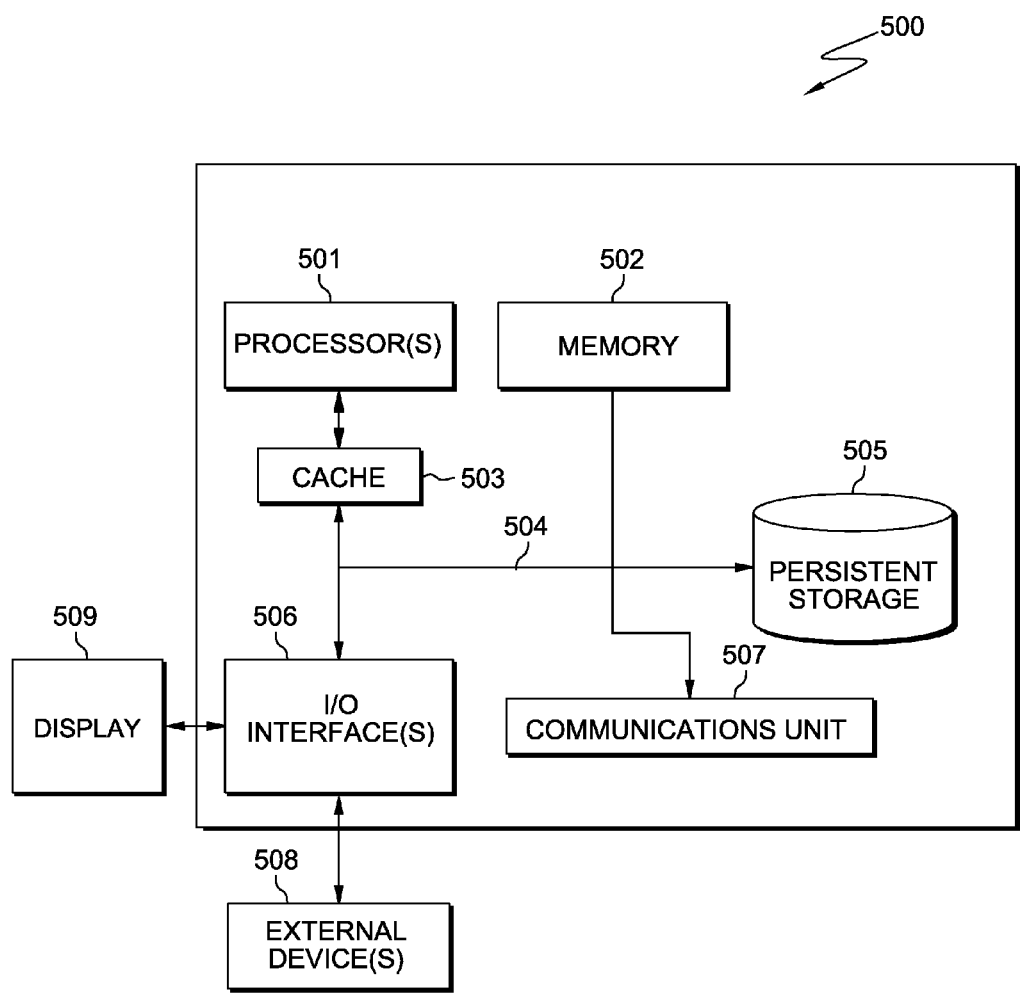
FIG. 5 is a block diagram of components of a computer system, such as the computer server of FIG. 1, in an embodiment in accordance with the present invention.

FIG. 5 depicts computer system 500, where master server computer 102 is one example of a system that includes data management program 108A. The computer system includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  receiving, by one or more processors of a set of processors, a query for a first row of data, wherein a first column of the first row of data is stored in a first data server and a second column of the first row of data is stored in a second data server;
  translating, by one or more processors of the set of processors, the query for the first row of data into two queries, wherein a first translated query is for the first column of the first row of data and a second translated query is for the second column of the first row of data;
  sending, by one or more processors of the set of processors, the first translated query to the first data server and the second translated query to the second data server; and
  responsive to receiving the first column of the first row of data from the first data server and the second column of the first row of data from the second data server, sending, by one or more processors of the set of processors, the first column and the second column of the first row of data to an electronic device associated with the received query.

2. The method of claim 1, wherein translating the query for a first row of data into two queries further comprises:
  identifying, by one or more processors of the set of processors, a first GUID for the first row of data;
  identifying, by one or more processors of the set of processors, the first column of the first row of data stored in the first data server based at least on the first GUID; and
  identifying, by one or more processors of the set of processors, the second column of the first row of data stored in the second data server based at least on the first GUID.

3. The method of claim 2, further comprising:
  subsequent to identifying the first GUID for the first row of data, encrypting, by one or more processors of the set of processors, the first GUID according to an encryption key.

4. The method of claim 1, further comprising:
  receiving, by one or more processors of the set of processors, a request to store a second row of data;
  identifying, by one or more processors of the set of processors, a second GUID for the second row of data;
  storing, by one or more processors of the set of processors, a first column of the second row of data with the second GUID in the first data server; and
  storing, by one or more processors of the set of processors, a second column of the second row of data with the second GUID in the second data server.

5. The method of claim 4, further comprising:
  subsequent to identifying the second GUID for the second row of data, encrypting, by one or more processors of the set of processors, the second GUID according to an encryption key.

6. The method of claim 4, further comprising:
  receiving, by one or more processors of the set of processors, a request to store an altered first column of the second row of data;
  requesting, by one or more processors of the set of processors, the second GUID for the second row of data; and
  storing, by one or more processors of the set of processors, the altered first column of the second row of data with the second GUID in the first data server.

7. The method of claim 1, further comprising:
  determining, by one or more processors of the set of processors, whether the electronic device associated with the received query can receive the first row of data based at least on credential verification; and determining, by one or more processors of the set of processors, the electronic device can receive the first row of data.

8. A computer program product comprising:
one or more computer readable tangible storage media and program instructions stored on at least one of the one or more storage media, the program instructions comprising:
program instructions to receive a query for a first row of data, wherein a first column of the first row of data is stored in a first data server and a second column of the first row of data is stored in a second data server;
program instructions to translate the query for the first row of data into two queries, wherein a first translated query is for the first column of the first row of data and a second translated query is for the second column of the first row of data;
program instructions to send the first translated query to the first data server and the second translated query to the second data server; and
program instructions to, responsive to receiving the first column of the first row of data from the first data server and the second column of the first row of data from the second data server, send the first column and the second column of the first row of data to an electronic device associated with the received query.

9. The computer program product of claim 8, wherein translating the query for a first row of data into two queries further comprises program instructions, stored on the one or more computer readable storage media, which when executed by a processor, cause the processor to:
identify a first GUID for the first row of data;
identify the first column of the first row of data stored in the first data server based at least on the first GUID; and
identify the second column of the first row of data stored in the second data server based at least on the first GUID.

10. The computer program product of claim 9, further comprising program instructions, stored on the one or more computer readable storage media, which when executed by a processor, cause the processor to:
subsequent to identifying the first GUID for the first row of data, encrypt the first GUID according to an encryption key.

11. The computer program product of claim 8, further comprising program instructions, stored on the one or more computer readable storage media, which when executed by a processor, cause the processor to:
receive a request to store a second row of data;
identify a second GUID for the second row of data;
store a first column of the second row of data with the second GUID in the first data server; and
store a second column of the second row of data with the second GUID in the second data server.

12. The computer program product of claim 11, further comprising program instructions, stored on the one or more computer readable storage media, which when executed by a processor, cause the processor to:
subsequent to identifying the second GUID for the second row of data, encrypt the second GUID according to an encryption key.

13. The computer program product of claim 11, further comprising program instructions, stored on the one or more computer readable storage media, which when executed by a processor, cause the processor to:
receive a request to store an altered first column of the second row of data;
request the second GUID for the second row of data; and
store the altered first column of the second row of data with the second GUID in the first data server.

14. The computer program product of claim 8, further comprising program instructions, stored on the one or more computer readable storage media, which when executed by a processor, cause the processor to:
determine whether the electronic device associated with the received query can receive the first row of data based at least on credential verification; and
determine the electronic device can receive the first row of data.

15. A computer system comprising:
one or more computer processors;
one or more computer readable storage media; and
program instructions stored on the computer readable storage media for execution by at least one of the one or more computer processors, the program instructions comprising:
program instructions to receive a query for a first row of data, wherein a first column of the first row of data is stored in a first data server and a second column of the first row of data is stored in a second data server;
program instructions to translate the query for the first row of data into two queries, wherein a first translated query is for the first column of the first row of data and a second translated query is for the second column of the first row of data;
program instructions to send the first translated query to the first data server and the second translated query to the second data server; and
program instructions to, responsive to receiving the first column of the first row of data from the first data server and the second column of the first row of data from the second data server, send the first column and the second column of the first row of data to an electronic device associated with the received query.

16. The computer system of claim 15, wherein translating the query for a first row of data into two queries further comprises program instructions, stored on the one or more computer readable storage media, which when executed by a processor, cause the processor to:
identify a first GUID for the first row of data;
identify the first column of the first row of data stored in the first data server based at least on the first GUID; and
identify the second column of the first row of data stored in the second data server based at least on the first GUID.

17. The computer system of claim 16, further comprising program instructions, stored on the one or more computer readable storage media, which when executed by a processor, cause the processor to:
subsequent to identifying the first GUID for the first row of data, encrypt the first GUID according to an encryption key.

18. The computer system of claim 15, further comprising program instructions, stored on the one or more computer readable storage media, which when executed by a processor, cause the processor to:
receive a request to store a second row of data;
identify a second GUID for the second row of data;
store a first column of the second row of data with the second GUID in the first data server; and
store a second column of the second row of data with the second GUID in the second data server.

19. The computer system of claim 18, further comprising program instructions, stored on the one or more computer readable storage media, which when executed by a processor, cause the processor to:
    subsequent to identifying the second GUID for the second row of data, encrypt the second GUID according to an encryption key.

20. The computer system of claim 18, further comprising program instructions, stored on the one or more computer readable storage media, which when executed by a processor, cause the processor to:
    receive a request to store an altered first column of the second row of data;
    request the second GUID for the second row of data; and
    store the altered first column of the second row of data with the second GUID in the first data server.

\* \* \* \* \*